(12) United States Patent
Hogan (10) Patent No.: US 8,066,229 B2
(45) Date of Patent: Nov. 29, 2011

(54) ATTACHABLE WING

(76) Inventor: Guy John Hogan, Keyport, NJ (US)

( * ) Notice: Subject to any disclaimer, the term of this patent is extended or adjusted under 35 U.S.C. 154(b) by 656 days.

(21) Appl. No.: 12/420,038

(22) Filed: Apr. 7, 2009

(65) Prior Publication Data

US 2010/0252687 A1 Oct. 7, 2010

(51) Int. Cl.
*B64C 3/44* (2006.01)
(52) U.S. Cl. ...................... 244/219; 244/45 R
(58) Field of Classification Search .................. 244/219
See application file for complete search history.

(56) References Cited

U.S. PATENT DOCUMENTS

| | | | |
|---|---|---|---|
| 5,509,623 A * | 4/1996 | Schmittle | 244/48 |
| 5,615,846 A * | 4/1997 | Shmoldas et al. | 244/3.28 |
| 7,559,505 B2 * | 7/2009 | Janka | 244/3.28 |
| 7,665,690 B2 * | 2/2010 | Sheahan et al. | 244/49 |
| 7,699,261 B2 * | 4/2010 | Colten et al. | 244/45 R |
| 7,816,635 B2 * | 10/2010 | Fink | 244/3.28 |
| 7,938,358 B2 * | 5/2011 | Dietrich et al. | 244/2 |
| 7,946,527 B2 * | 5/2011 | Holmes | 244/49 |
| 2002/0011539 A1 | 1/2002 | Carter, Jr. | |
| 2005/0151001 A1 | 7/2005 | Loper | |
| 2006/0157614 A1 | 7/2006 | Simpson | |

* cited by examiner

*Primary Examiner* — Joshua Michener
*Assistant Examiner* — Medhat Badawi
(74) *Attorney, Agent, or Firm* — Michael R. Kahn (57) ABSTRACT

An attachable wing for an aircraft is disclosed. The attachable wing is configured to mount to the underside of the fuselage of an aircraft, such as a rotary wing aircraft (e.g., a helicopter) or a fixed wing aircraft. The attachable wing produces additional lift, which results in an increase in speed, and consequently, an increase in fuel efficiency and payload capacity. In some embodiments, the attachable wing is retractable to facilitate takeoffs and landings. Additionally, the apparatus may be made of a bulletproof or anti-ballistic material to protect the aircraft from incoming fire or crash damage. The airfoil apparatus provides additional lift, allowing for greater fuel efficiency and range of the aircraft on which it is installed.

19 Claims, 11 Drawing Sheets

FIG. 12

ATTACHABLE WING

FIELD OF THE INVENTION

The present invention relates to aircraft. More specifically, the present invention relates to airfoils mounted on aircraft.

BACKGROUND

Rotary wing aircraft (e.g. helicopters, gyroplanes, and the like, hereinafter, referred to generally as "helicopters") are useful in a wide variety of applications. In civilian roles, helicopters are used for transport, rescue missions, firefighting, ambulance missions, traffic reporting, and sightseeing excursions, to name a few. In military applications, helicopters play a vital role in battlefield support and other military operations. These include delivering supplies and troops into areas of military conflict. As helicopters play a vital role in both civilian and military applications, it is therefore desirable to have a helicopter that has improved fuel economy, performance, and safety. Similarly, fixed wing aircraft also have a wide variety of uses, and it is equally desirable to have fixed wing aircraft with improved fuel economy, performance, and safety.

SUMMARY OF THE INVENTION

Embodiments of the present invention provide an apparatus for attachment to the underside of the fuselage of an aircraft, such as a rotary wing aircraft (e.g., a helicopter) or a fixed wing aircraft, comprising an airfoil mounted to the underside of the fuselage in order to produce some laminar flow through the device and limit turbulence as much as possible.

In theoretical operation, fluid flow through the airfoil apparatus causes a pressure drop to develop across the length of the device, thus exploiting basic fluid dynamic phenomena and thermodynamic principles to force the fluid (here, air) from the side of high pressure to the side of low pressure. This flow causes an upward force (i.e., lift) to develop on the underside of the aircraft, which results in an increase in speed, and consequently, an increase in fuel efficiency and payload capacity. In accordance with further embodiments of the present invention, the airfoil apparatus are retractable via a retraction system, and may be activated via hydraulic, cable, or other means. Additionally, the apparatus may be made of a bulletproof or anti-ballistic material to protect the aircraft from incoming fire or crash damage.

The airfoil apparatus may be comprised of a lightweight metal, such as aluminum or titanium. A composite material may also be used, such as fiberglass, or carbon fiber. Furthermore, an anti-ballistic material, such as Kevlar, or DYNEEMA UD, (produced by DSM DYNEEMA of the Netherlands) may be used to line the airfoil, or even form the airfoil, to provide additional protection from ground fire. This is particularly useful in the case of helicopters, which may be flying slower and lower over a hostile battle zone. The airfoil apparatus may also serve as additional protection in the event of a crash landing, in which case the airfoil apparatus may act as a crumple-zone, and absorb a portion of the impact, providing additional protection for the occupants.

Embodiments of the present invention provide an airfoil apparatus that can be designed into new aircraft, or developed as a kit for existing aircraft. The airfoil apparatus provides additional lift, allowing for greater fuel efficiency and range of the aircraft on which it is installed.

DETAILED DESCRIPTION

Figure 1:
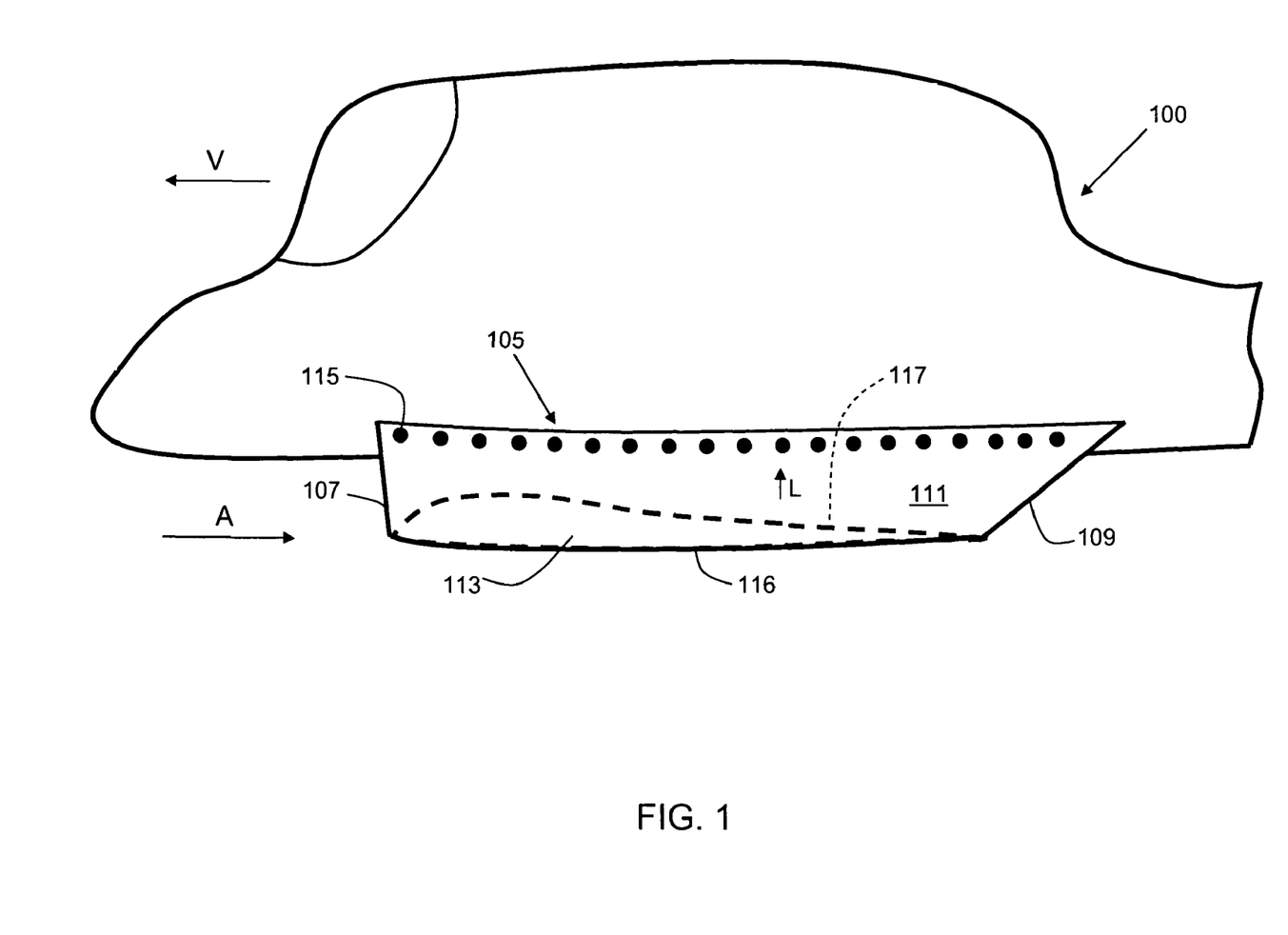
FIG. 1 is a cutaway view of the airfoil apparatus in accordance with an embodiment of the present invention.

FIG. 1 is a cutaway view of a portion of an airframe 100 having the airfoil apparatus 105 mounted on the airframe. The airfoil 105 has lower panel 113 which is comprised of a relatively flat bottom surface 116, and an airfoil shaped upper surface 117. Side panel 111 has front edge 107, and rear edge 109. As the airframe 100 moved forward (the direction indicated by arrow V), air is forced over airfoil shaped upper surface 117 at a faster rate than air traveling along lower surface 116, thereby creating lift (indicated by arrow L). This takes advantage of space previously not utilized, for the purposes of generating lift. The generated lift can improve fuel efficiency and therefore, the range of the aircraft. In one embodiment, airfoil apparatus 105 is fastened to the lower sides of airframe 100 via a plurality of fasteners 121. In one embodiment, fasteners 121 are rivets or screws. Alternatively, the airfoil apparatus 105 may be welded in place. Airfoil apparatus 105 may also be mounted directly to the underside of airframe 100 instead of on the lower sides.

Figure 1A:
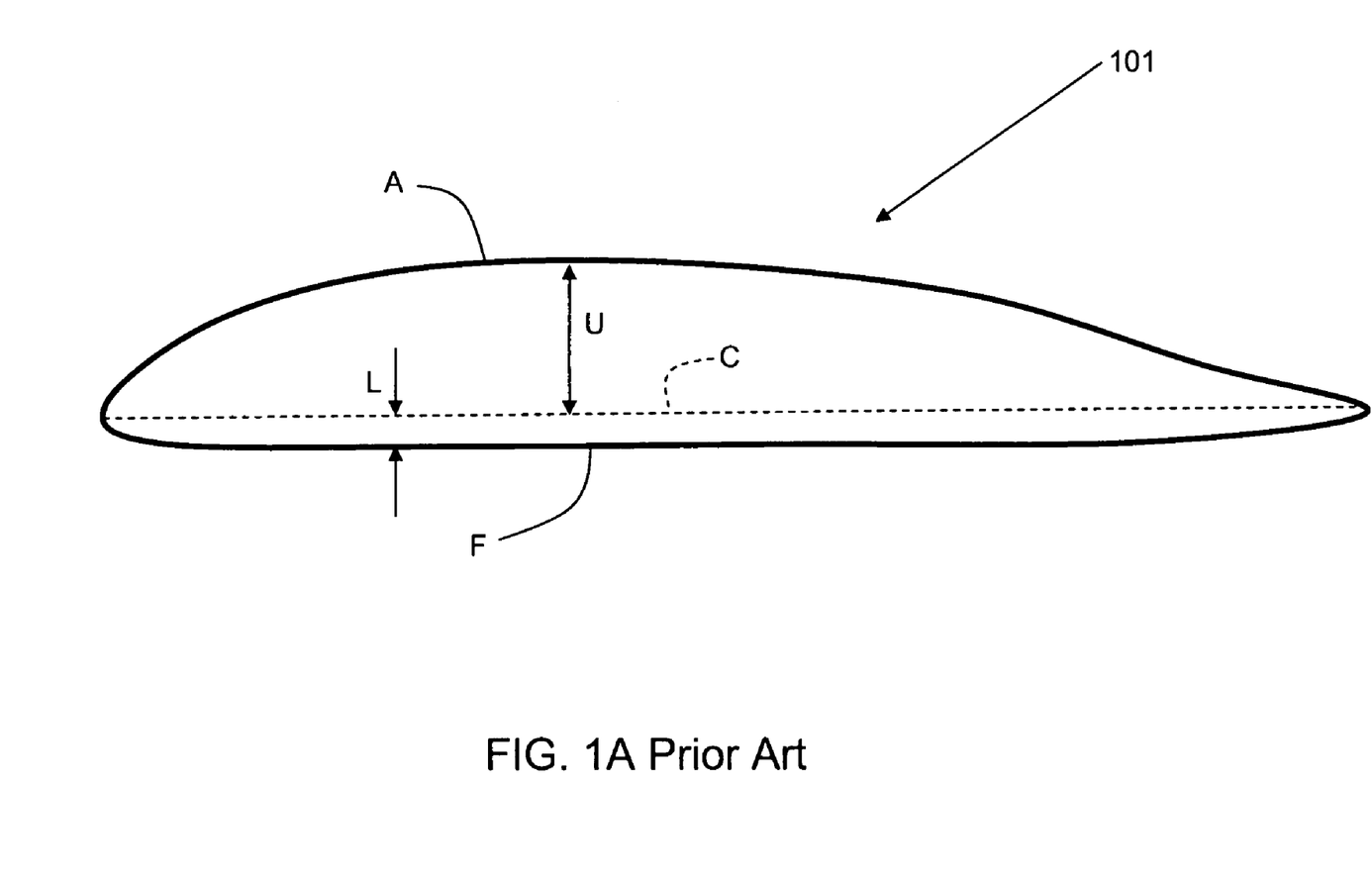
FIG. 1A shows a prior art airfoil for the purposes of establishing definitions.

FIG. 1A shows a prior art airfoil for the purposes of establishing definitions. For the purposes of this disclosure, an airfoil is the shape shown generally as 101 in FIG. 1A. Airfoil 101 has chord line C which is a straight line connecting the leading and trailing edges of the airfoil. Upper camber U is the distance between chord line C, and the upper surface A, and lower camber L is the distance between chord line C, and the lower surface F, where the upper camber U is greater than or equal to the lower camber L. For the purposes of this disclosure, the lower surface F is referred to as the "flat side" of the airfoil, and the upper surface A is referred to as the "airfoil side" of the airfoil 101.

Figure 2:
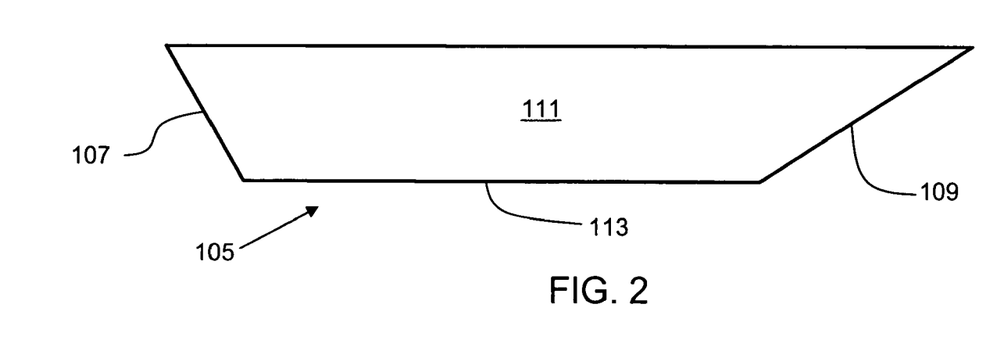
FIG. 2 is a side view of the airfoil apparatus.

FIG. 2 is a side view of the airfoil apparatus 105, showing front edge 107, rear edge 109, side panel 111, and lower panel 113.

Figure 3:
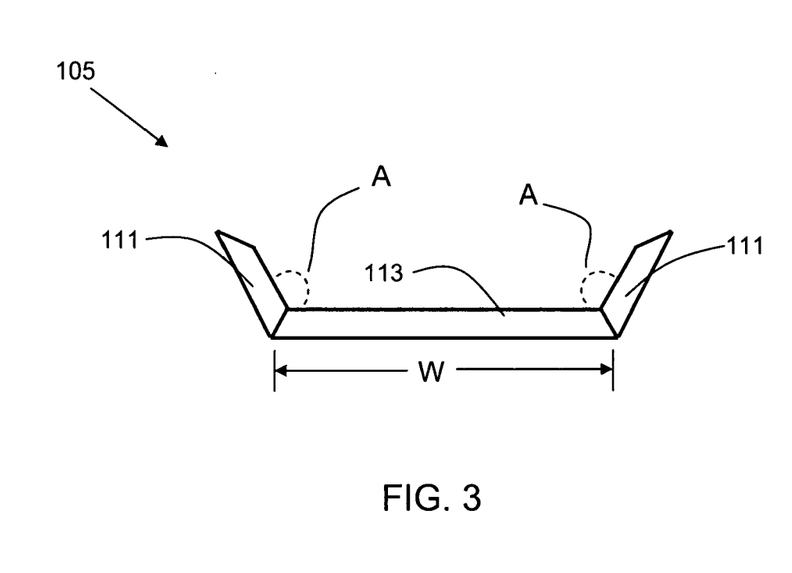
FIG. 3 is a front view of the airfoil apparatus.

FIG. 3 is a front view of the airfoil apparatus 105. Side panels 111 join to lower panel 113 at angle A. In one embodiment, angle A ranges from about 90 degrees to about 130 degrees. The lower panel 113 has a width W that is approximately equal to or less than the width of the fuselage of the aircraft it is mounted to.

Figure 4:
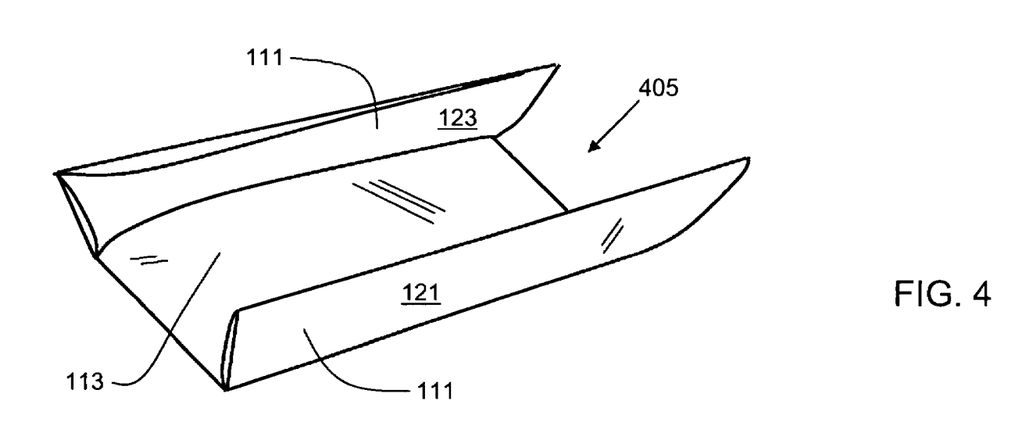
FIG. 4 is a perspective view of the airfoil apparatus.

FIG. 4 is a perspective view of an airfoil apparatus 405. In this embodiment, the side panels 111 are of an airfoil shape, where outer surface 121 is the flat side, inner surface 123 is the airfoil side (refer to FIG. 1A for explanation about the "flat side" and the "airfoil side"), thereby creating additional lift.

Figure 5:
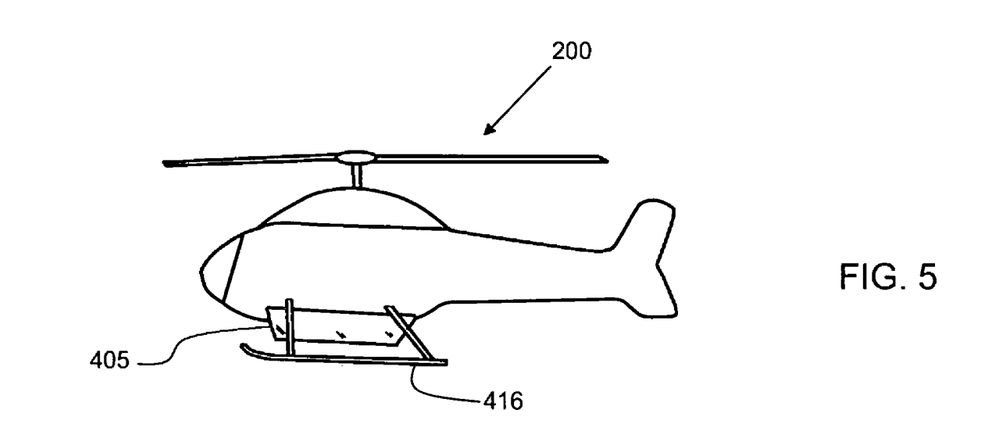
FIG. 5 is a view of a helicopter with an airfoil apparatus in accordance with an embodiment of the present invention.

FIG. 5 is a view of a helicopter 200 with an airfoil apparatus 405 in accordance with an embodiment of the present invention. If landing skids 416 provide sufficient ground clearance, then the airfoil apparatus 405 is suitable. For aircraft with low ground clearance, an embodiment with a retractable airfoil apparatus will now be described.

Figure 6A:
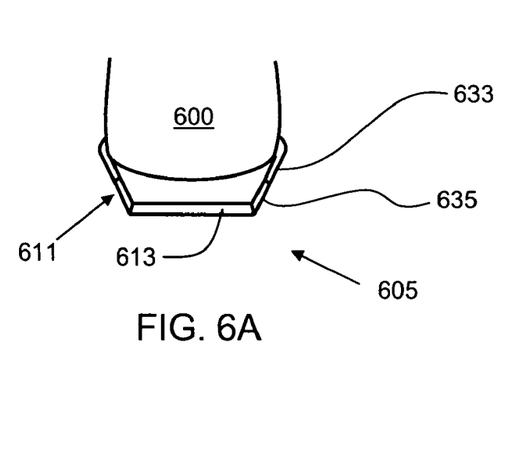
FIGS. 6A-6C illustrate a retractable airfoil apparatus.
Figure 6B:
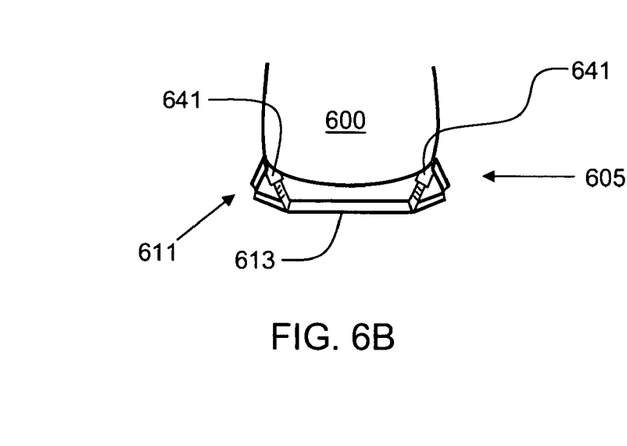
Figure 6C:
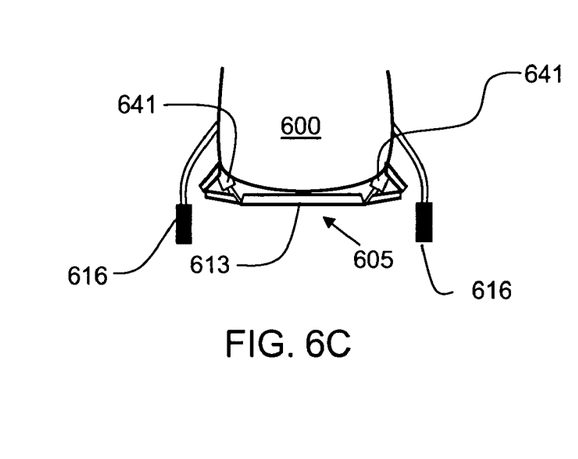

FIGS. 6A-6C illustrate a retractable airfoil apparatus 605 mounted to the lower sides of airframe 600. In this embodiment, the side panels 611 are comprised of an upper portion 633, and lower portion 635. Upper portions 633 and corresponding lower portions 635 are joined via hinges. Lower panels 635 are also attached to lower panel 613 via a hinge or other suitable pivot mechanism FIG. 6A shows the airfoil 605 in a fully extended position. Actuators, such as hydraulic pistons, or threaded shafts are used to raise and lower the airfoil 605. FIG. 6B shows the airfoil 605 in a partially retracted position, where the side panels 611 are partially folded, thereby raising lower panel 613 so that it is closer to airframe 600. In the partially retracted position of FIG. 6B, hydraulic pistons 641 are visible. Note that in the fully extended position of FIG. 6A, the pistons are not visible, since they are hidden by the side panels 611. Pistons 641 are affixed to airframe 600 at one end, and affixed to lower panel 613 at the other end. The pistons hold the airfoil in the extended position (FIG. 6A) during flight, and retract the airfoil for landing. FIG. 6C shows the airfoil 605 in a fully retracted position. In this position, the pistons 641 are contracted to their minimum length, thereby raising lower panel 613 to allow safe landing. In one embodiment, the retraction of airfoil 605 is synchronized to the extending of landing gear 616. Landing gear 616 is in a retracted position in FIGS. 6A and 6B, and hence, not shown in those figures. The retractable airfoil embodiment is useful in cases where the ground clearance of the aircraft is not sufficient for a fixed-position airfoil apparatus, such as that shown as 105 in FIG. 1.

Figure 7:
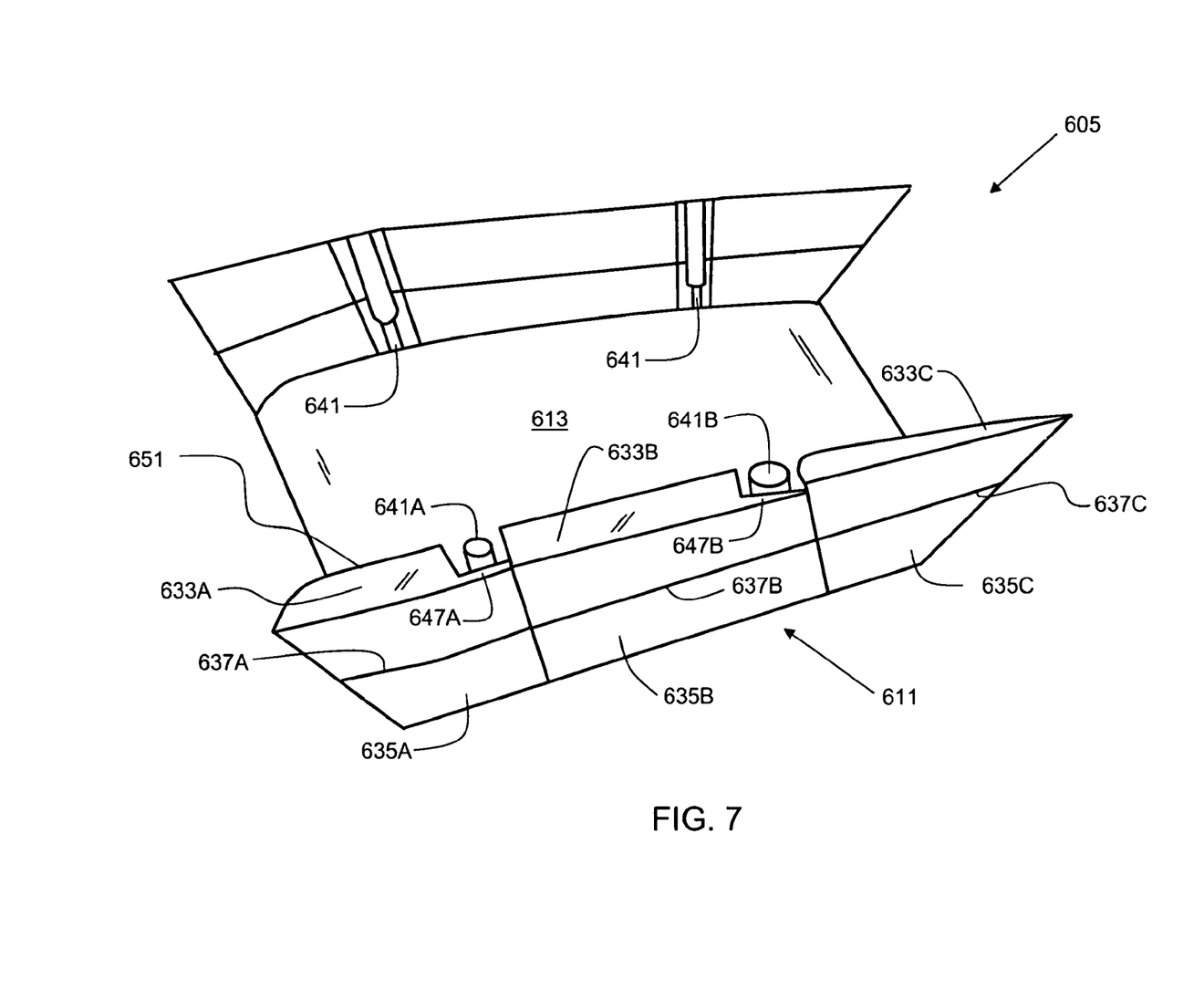
FIG. 7 is a perspective view of a retractable airfoil apparatus.

FIG. 7 shows a retractable airfoil apparatus 605. In this embodiment, side panel 611 is comprised of three upper portions 633A, 633B, and 633C, and three corresponding lower portions, 635A, 635B, and 635C, respectively. Each upper portion is connected to its corresponding lower position via a hinge 637A, 637B, and 637C, respectively. Lower panels 635A, 635B, and 635C, are also attached to lower panel 613 via a hinge or other suitable pivot mechanism (observable in FIG. 6B and FIG. 6C). The lower end of each piston 641 is attached to lower panel 613. As pistons 641 extend, the side panel 611 extends, to configure the airfoil apparatus 605 for normal flight (see FIG. 6A). As pistons 641 retract, the side panel 611 folds, and lower panel 613 is raised, to configure the airfoil apparatus 605 for landing (see FIG. 6C). Upper portion 633A comprises thin portion 647A which shields piston 641A. Similarly, upper portion 633B comprises thin portion 647B which shields piston 641B. In this embodiment, the side panel 611 has an airfoil shape, with the airfoil surface (indicated by reference 651) facing the interior of the airfoil apparatus. By using side panels 611 which have an airfoil shape, additional lift can be generated.

Figure 8:
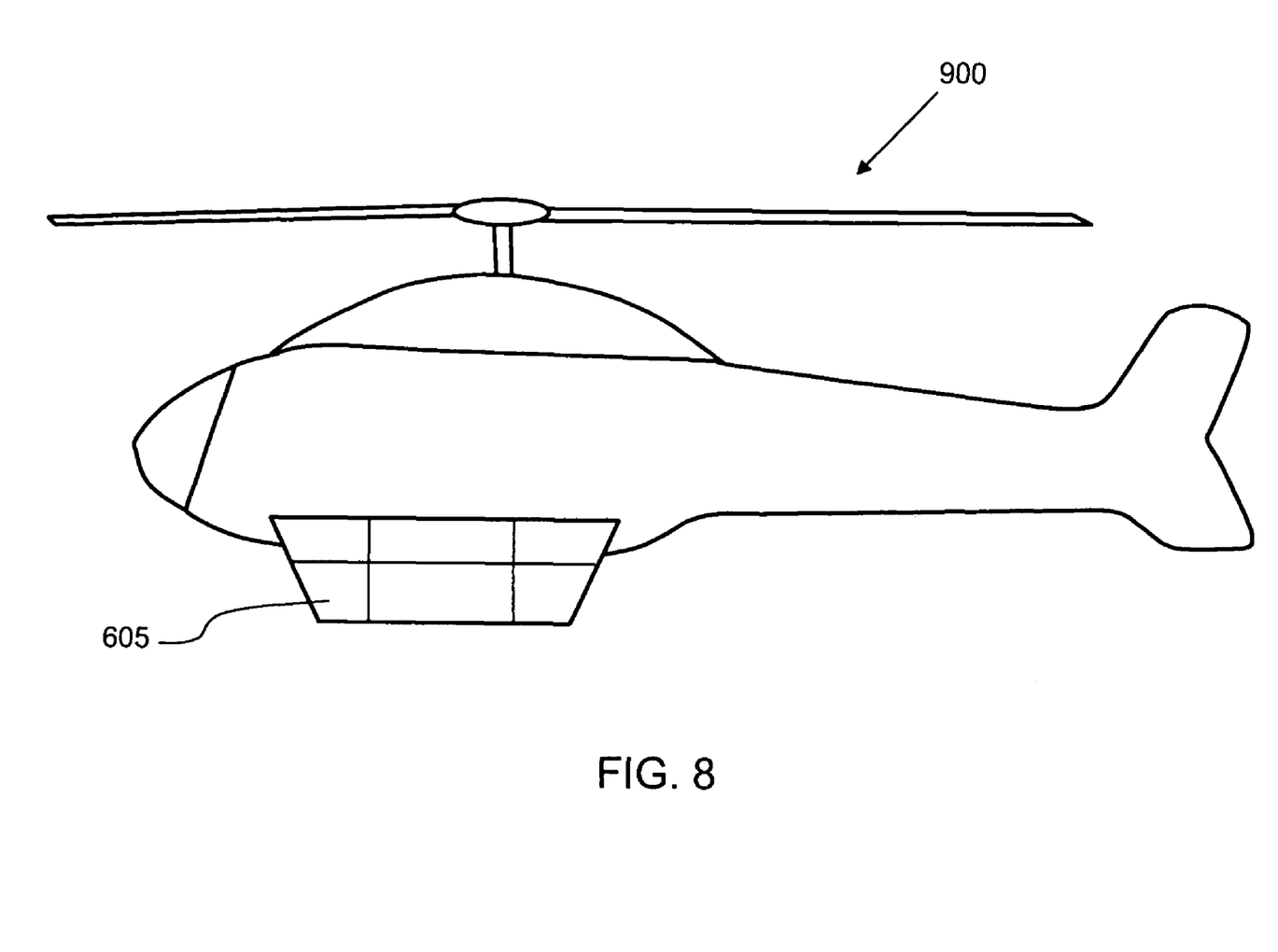
FIG. 8 is a view of a helicopter with a retractable airfoil apparatus in accordance with an embodiment of the present invention.
Figure 9:
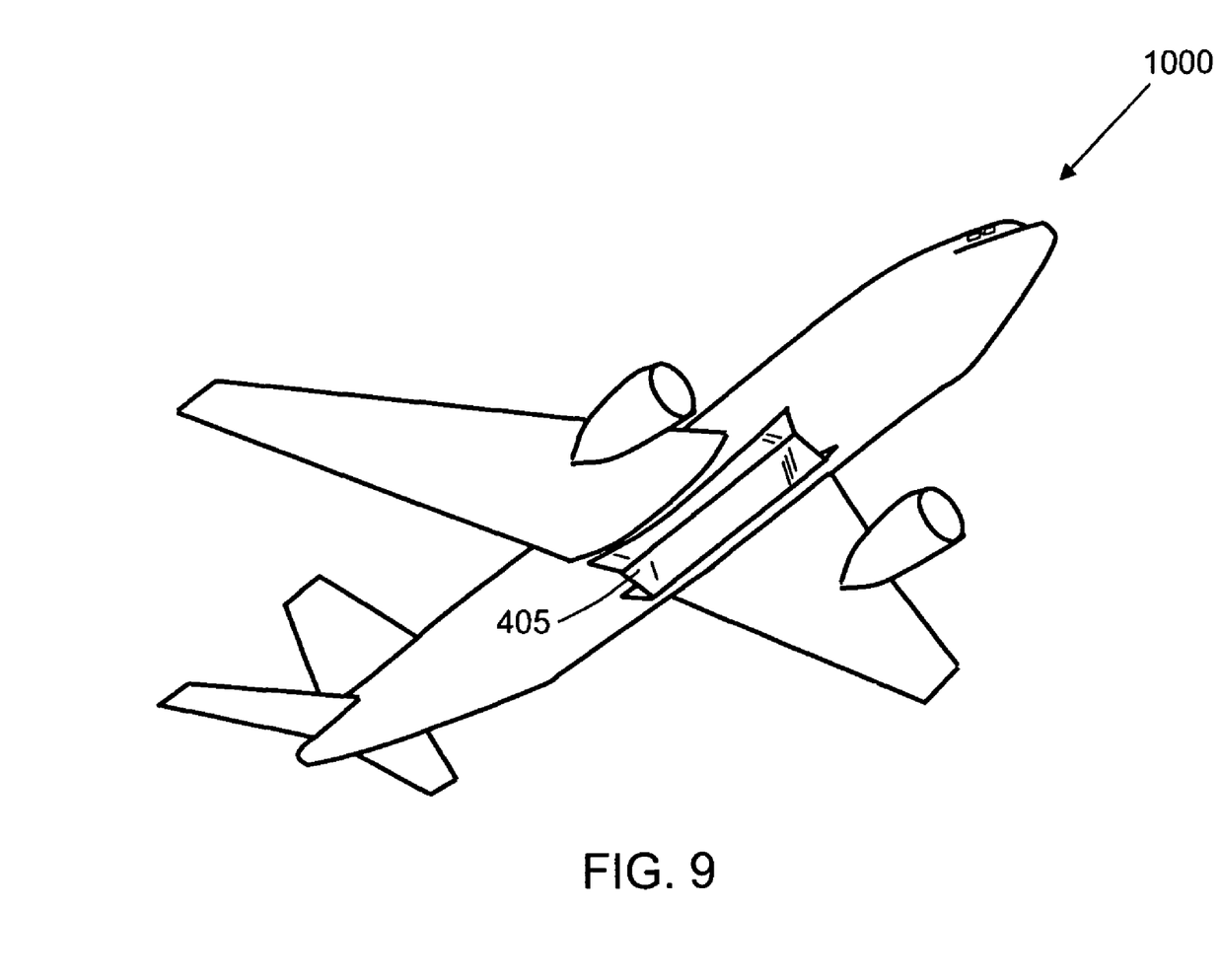
FIG. 9 sis a view of a large fixed wing aircraft with an airfoil apparatus in accordance with an embodiment of the present invention.
Figure 10:
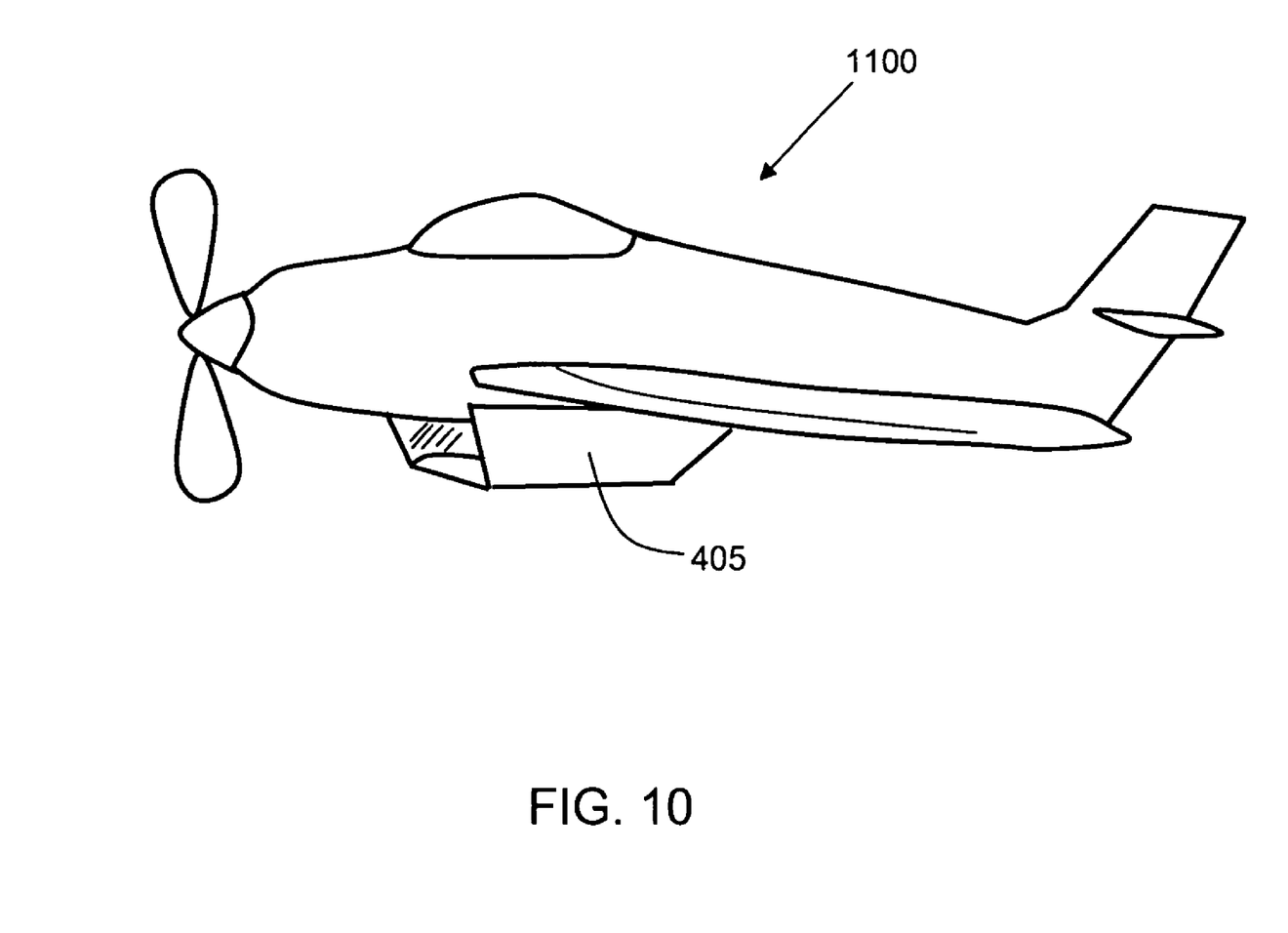
FIG. 10 is a view of a small fixed wing aircraft with an airfoil apparatus in accordance with an embodiment of the present invention.

FIGS. 8-10 show various aircrafts utilizing an airfoil apparatus in accordance with embodiments of the present invention. FIG. 8 is a view of a helicopter 900 with a retractable airfoil apparatus 605 in accordance with an embodiment of the present invention. FIG. 9 is a view of a large, jet powered, fixed wing aircraft 1000 with an airfoil apparatus 405 in accordance with an embodiment of the present invention. FIG. 10 is a view of a smaller, propeller driven, fixed wing aircraft 1100 with an airfoil apparatus 405 in accordance with an embodiment of the present invention. For both helicopters and fixed wing aircraft, it is preferable to mount the airfoil apparatus (e.g. 405 or 605) near the center of gravity of the aircraft, providing increased lift, while also maintaining stability of the aircraft.

Figure 11:
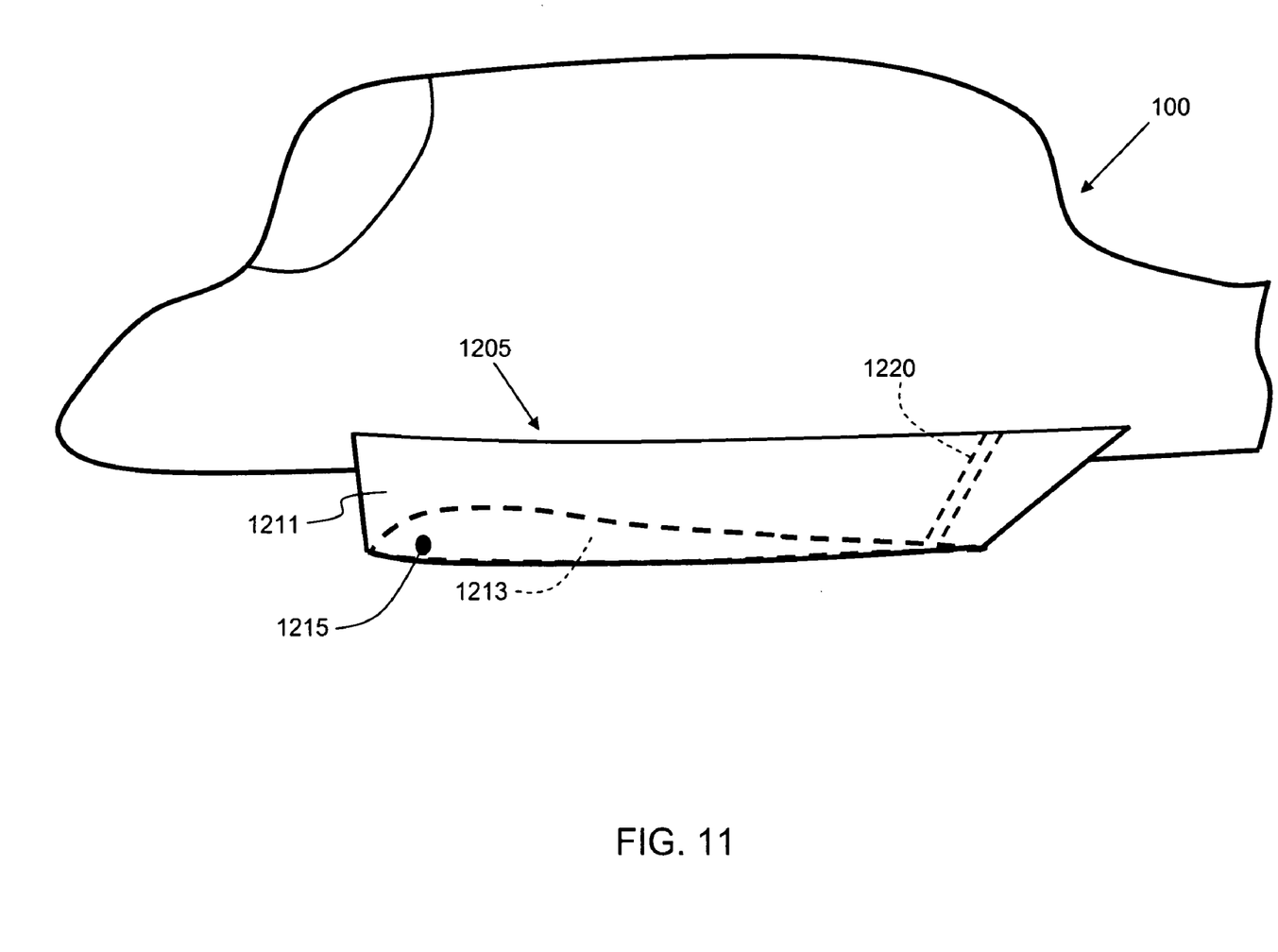
FIGS. 11-12 show an alternative embodiment of an airfoil apparatus in accordance with the present invention.
Figure 12:
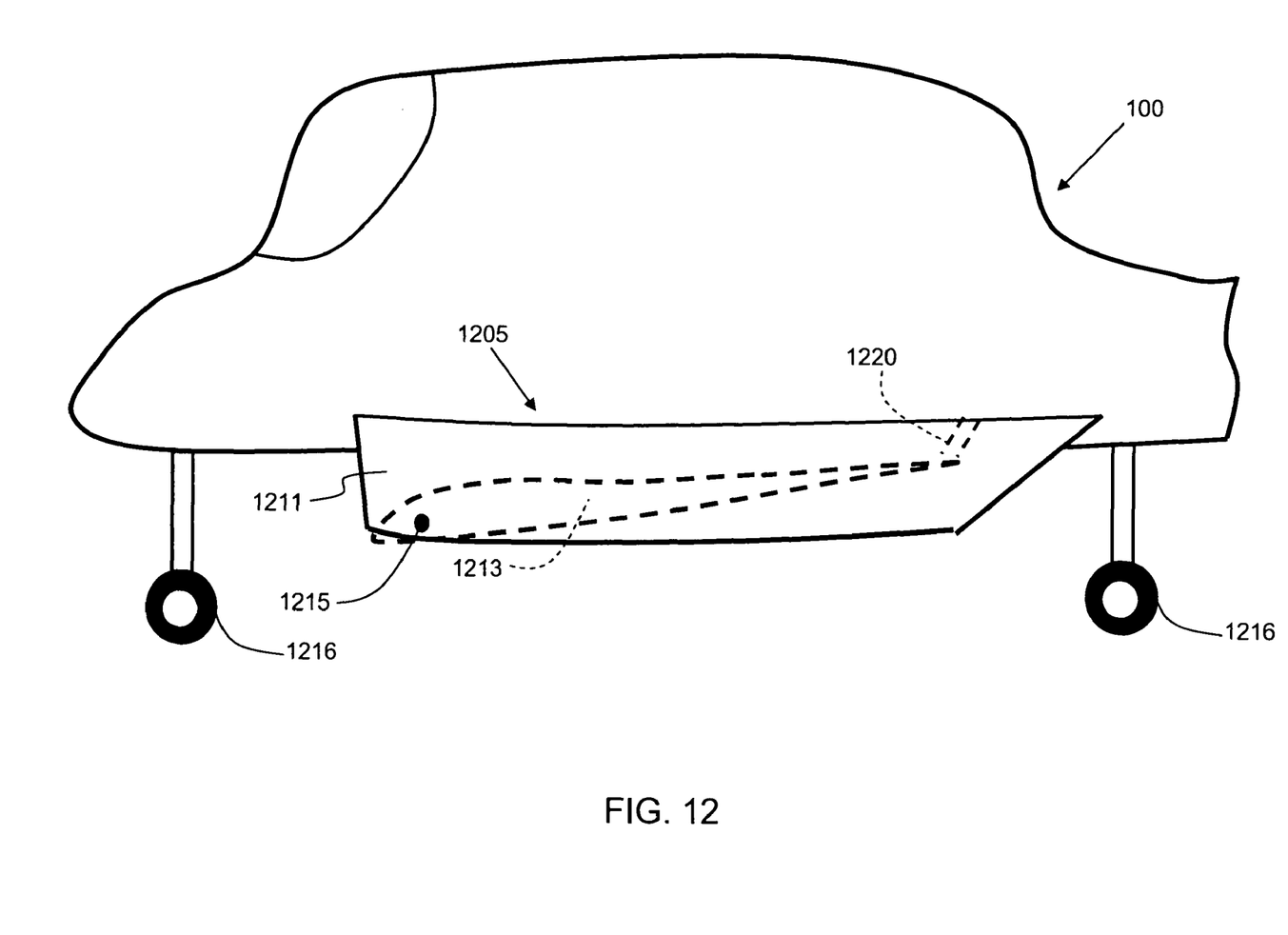

FIGS. 11-12 show an alternative embodiment of an airfoil apparatus 1205 in accordance with the present invention. FIG. 11 shows airfoil 1205 in a normal flight configuration. Lower panel 1213 comprises pivot mechanism 1215 at the front end of lower panel 1213 which is affixed to side panels 1211 and which allows adjustment of the angle of lower panel 1213 with respect to airframe 100. A lifting mechanism 1220, such as hydraulically actuated pistons, or a threaded shaft raises and lowers the rear of lower panel 1213. FIG. 12 shows the airfoil apparatus 1205 in a landing configuration, with landing gear 1216 extended, and lifting mechanism 1220 contracted to raise the rear end of lower panel 1213. After an aircraft touches down on a runway, the airfoil apparatus 1205 is then put into the configuration shown in FIG. 12. This configuration causes the airfoil apparatus 1205 to stop generating lift, and serves to slow the aircraft upon landing, thereby helping to reduce landing distance required for the aircraft.

Although the description above contains many specific details, these should not be construed as limiting the scope of the invention, but merely as providing illustrations of some of the presently preferred embodiments of the present invention. The present invention may have various other embodiments. Furthermore, while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed. Thus, the scope of the invention should be determined by the appended claims and their legal equivalents, rather than solely by the examples given.

What is claimed is:

1. An airfoil apparatus comprising: a lower panel, the lower panel having an airfoil shape, a first side panel, the first side panel mounted to the lower panel, a second side panel, the second side panel mounted to the lower panel, wherein the lower panel is configured and disposed entirely below an aircraft fuselage, such that air can pass between the lower panel and the surface of the fuselage, and wherein the airfoil apparatus is mounted to the underside of the aircraft fuselage proximal to the center of gravity of the aircraft fuselage.

2. The airfoil apparatus of claim 1, wherein the lower panel, first side panel, and second side panel, are comprised of aluminum.

3. The airfoil apparatus of claim 1, wherein the lower panel, first side panel, and second side panel, are comprised of titanium.

4. The airfoil apparatus of claim 1, wherein the lower panel, first side panel, and second side panel, are comprised of fiberglass.

5. The airfoil apparatus of claim 1, wherein at least the lower panel is comprised of an anti-ballistic material.

6. The airfoil apparatus of claim 1, wherein the first side panel and second side panel are airfoils.

7. The airfoil apparatus of claim 1, wherein the first side panel and second side panel form an angle with the lower side panel ranging from about 90 degrees to about 130 degrees.

8. An aircraft comprising a fuselage and an airfoil apparatus, the airfoil apparatus comprising: a lower panel, the lower panel having an airfoil shape, a first side panel, the first side panel mounted to the lower panel, a second side panel, the second side panel mounted to the lower panel, wherein the first side panel and second side panel are affixed to the aircraft fuselage, and wherein the lower panel is configured and disposed entirely below the aircraft fuselage, such that air can pass between the lower panel and the surface of the fuselage, and wherein the airfoil apparatus is mounted to the underside of the aircraft fuselage proximal to the center of gravity of the aircraft fuselage.

9. The aircraft of claim 8, wherein the aircraft is a rotary wing aircraft.

10. The aircraft of claim 8, wherein the aircraft is a fixed wing aircraft.

11. The aircraft of claim 8, wherein the airfoil apparatus is retractable.

12. The aircraft of claim 11, wherein the first side panel and second side panel are foldable.

13. The aircraft of claim 12, wherein a plurality of actuators are affixed to the lower panel, and configured and disposed to raise the lower panel, thereby providing additional ground clearance during takeoff and landing operation of the aircraft.

14. The aircraft of claim 8, wherein the first side panel and second side panel are affixed to the aircraft fuselage with a plurality of rivets.

15. The aircraft of claim 8, wherein the first side panel and second side panel are affixed to the aircraft fuselage with a plurality of welds.

16. The aircraft of claim 10, wherein the lower panel comprises a pivot mechanism affixed to the first side panel and second side panel, and at least one actuator configured and disposed to raise and lower the rear of the lower panel, thereby providing the capability to adjust the amount of lift provide by the airfoil apparatus.

17. The aircraft of claim 16, wherein the at least one actuator is a hydraulic piston.

18. An aircraft comprising a fuselage and an airfoil apparatus, the airfoil apparatus comprising: a lower panel, the lower panel having an airfoil shape, a first side panel, the first side panel mounted to the lower panel, a second side panel, the second side panel mounted to the lower panel, wherein the first side panel and second side panel are affixed to the aircraft fuselage, and wherein the lower panel is configured and disposed entirely below the aircraft fuselage and wherein the first side panel and second side panel are foldable, and wherein a plurality of actuators are affixed to the lower panel, and configured and disposed to raise the lower panel, thereby providing additional ground clearance during takeoff and landing operation of the aircraft, and wherein the first side panel and second side panel are affixed to the aircraft fuselage with a plurality of rivets, and wherein the aircraft is a helicopter, and wherein the airfoil apparatus is mounted to the underside of the aircraft fuselage proximal to the center of gravity of the aircraft fuselage.

19. The aircraft of claim 18, wherein first side panel and second side panel of the airfoil apparatus are airfoils.

\* \* \* \* \*